(No Model.)
W. BAPTIST.
SAWING MACHINE.
No. 416,088. Patented Nov. 26, 1889.
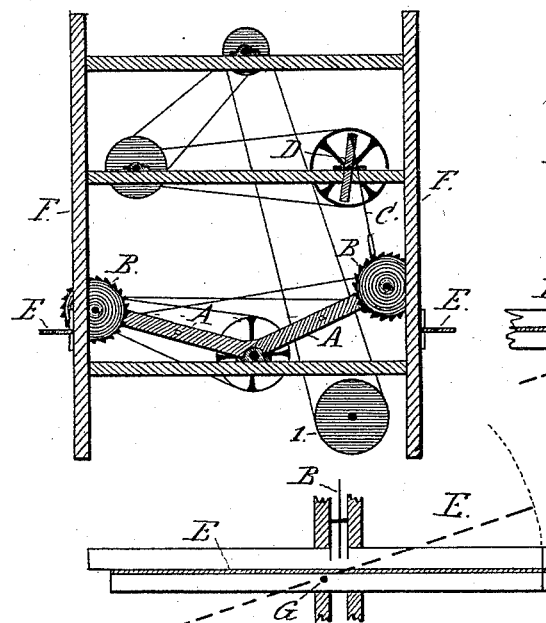
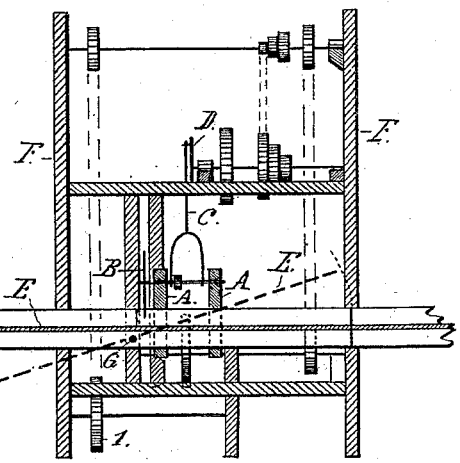
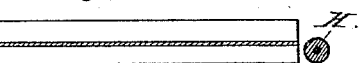
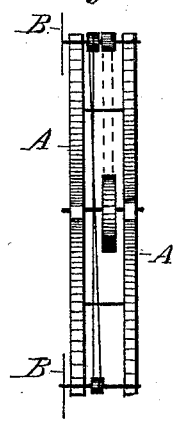
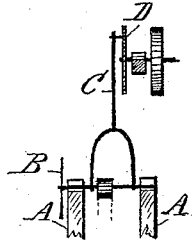
WITNESSES,
INVENTOR.
William Baptist
by W. R. Stringfellow
ATTORNEY.

UNITED STATES PATENT OFFICE.

WILLIAM BAPTIST, OF NEW ORLEANS, LOUISIANA, ASSIGNOR OF ONE-HALF TO BAPTIST & HOMAN, OF SAME PLACE.

SAWING-MACHINE.

SPECIFICATION forming part of Letters Patent No. 416,088, dated November 26, 1889.

Application filed July 11, 1889. Serial No. 317,124. (No model.)

*To all whom it may concern:*

Be it known that I, WILLIAM BAPTIST, a citizen of the United States, residing at New Orleans, in the parish of Orleans and State of Louisiana, have invented certain new and useful Improvements in Sawing-Machines; and I do declare the following to be a full, clear, and exact description of the invention, such as will enable others skilled in the art to which it appertains to make and use the same.

My invention relates to an improvement in cutting-machines in which two saws are made to operate in conjunction on each side of the frame; and the objects of my invention are to enable straight or beveled work to be accurately cut. I attain these objects by the mechanism illustrated in the accompanying drawings, in which—

Figure 1 is a side view. Fig. 2 is a front end view. Fig. 3 is a front view of the lumber-table. Fig. 4 is a top view of the saw-frame. Fig. 5 is a detail view of a portion of the frame A, showing the arm C, connecting the wheel D with the saw-shaft.

Similar letters refer to similar parts throughout the several views.

In constructing my machine I place within frame F frame A, with saws B adjusted to A, as shown in Fig. 4.

C is an arm, which acts in conjunction with wheel or disk D.

E are lumber tables or guides placed in front and rear of frame F, so as to enable material to be cut on either side of machine.

G is a bolt, which holds tables E in position, and which enables tables to be placed on an incline or at an angle, as shown by dotted lines in Figs. 2 and 3.

H is a roller, over which lumber can be carried and placed upon tables E.

I is a driving-pulley.

In operating my device I place lumber upon table or guides E, as shown in Figs. 2 and 3, this table being so constructed that an incline may be given to timber placed at any desired angle by means of G, which forms, as it were, an axis or guide, and by means of the table E, which is shown in front of the machine, as seen in Figs. 2 and 3, material is cut at an angle, or bevel work can be sawed; or, if preferable, where straight work is desired to be cut, the table E in the rear of machine, as shown in Fig. 1, may be used, as by the use of my machine two different grades of timber may be cut either straight or beveled, and there is no stoppage for shifting belts or changing tables, and for sawing box-timber it is unequaled.

Having fully described my invention, what I claim, and desire to secure by Letters Patent, is—

In a cutting-machine such as described, the saws B within frame A, the arms C, and wheel or disk D, the guides or tables E, acting in combination with bolt G for beveling or sawing timber at any desired angle, substantially as shown and described, and for the purpose set forth.

In testimony whereof I affix my signature in presence of two witnesses.

WILLIAM BAPTIST.

Witnesses:
PERCY D. PARKS,
HELMUTH HOLTZ.